United States Patent [19]
Sabotta et al.

[11] Patent Number: 6,128,686
[45] Date of Patent: Oct. 3, 2000

[54] HIDING PERIPHERAL MEMORY TRANSACTIONS ON A LOCAL BUS WITHIN A PERIPHERAL CONTROLLER FROM A HOST SYSTEM BUS

[75] Inventors: Michael L. Sabotta, Cypress; Bryan A. Jones, Houston; Thomas W. Grieff, Spring, all of Tex.

[73] Assignee: Compaq Computer Corporation, Houston, Tex.

[21] Appl. No.: 09/097,408

[22] Filed: Jun. 15, 1998

[51] Int. Cl.$^7$ ..................................................... G06F 13/00
[52] U.S. Cl. ........................................... 710/129; 711/114
[58] Field of Search ................................. 709/203; 710/3, 710/22, 107, 108, 129; 711/114, 152, 202

[56] References Cited

U.S. PATENT DOCUMENTS

| | | |
|---|---|---|
| 5,150,465 | 9/1992 | Bush et al. . |
| 5,241,630 | 8/1993 | Lattin, Jr. et al. . |
| 5,249,279 | 9/1993 | Schmenk et al. . |
| 5,448,709 | 9/1995 | Chandler et al. . |
| 5,469,548 | 11/1995 | Callison et al. . |
| 5,717,954 | 2/1998 | Grieff et al. . |
| 5,737,744 | 4/1998 | Callison et al. ........................ 711/114 |
| 5,838,932 | 11/1998 | Alzien . |
| 5,918,026 | 6/1999 | Melo et al. . |

Primary Examiner—Glenn A. Auve
Attorney, Agent, or Firm—Akin, Gump, Strauss, Hauer & Feld, LLP

[57] ABSTRACT

An embodiment of the present invention discloses a technique for concealing a peripheral memory transaction on a local bus within a peripheral controller from a host system bus. In the preferred embodiment both the local bus and the host system bus are PCI buses. The technique is implemented when a peripheral memory transaction is detected on the local bus. In a disclosed embodiment, the peripheral memory transaction is detected by monitoring command and byte enables (CBEs) and five upper address bits (AD [31::27]) of the local bus. A peripheral memory transaction is indicated when a memory transaction on the local bus is directed to an upper 128 MB of 4 GB host memory. When a memory transaction is detected to the upper 128 MB of memory the transaction is intercepted. The interception is accomplished by blocking the CBEs on the local bus from a peripheral interface.

The peripheral interface in the preferred embodiment is a standard PCI—PCI bridge which couples the local bus to the host system bus. After being intercepted, the CBEs are recoded so that the memory transaction does not appear on the host system bus. In the disclosed embodiment the memory CBEs are recoded to reserved CBEs of the same parity as the memory CBEs. An advantage of the present invention is that a standard PCI—PCI bridge can be utilized to interface the peripheral controller to the host system bus.

30 Claims, 4 Drawing Sheets

HIDING PERIPHERAL MEMORY TRANSACTIONS ON A LOCAL BUS WITHIN A PERIPHERAL CONTROLLER FROM A HOST SYSTEM BUS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to peripherals controllers and more specifically to hiding peripheral memory transactions on a disk array controller card from a host system bus.

2. Description of the Related Art

Servers are critical components of a computer network as their efficiency and reliability directly impact the efficiency and reliability of the computer network as a whole. Servers have typically been utilized to provide access to shared printers and files. As a general rule, a computer network has multiple file servers which have traditionally been used as storage hubs for various files. In a typical application, a copy of a stored file is transferred to a client on demand with an updated file being returned to the server for storage. As a result of on-demand file transfer, any delay in accessing files on a disk subsystem directly affects the efficiency of the network.

The requirement for high performance efficient networks has led to advances in disk drives and in disk subsystem architectures. Disk drive storage sizes have increased, access times have decreased, and data transfer rates have increased. However, while disk drive technology has advanced, processing capabilities of personal computers and workstations have also advanced. As more clients are added to a given network and the processing capability of those clients increase, there is a continuing push to further enhance the performance of disk subsystems servicing that network.

In response to the need for reliable inexpensive disk drive subsystems, redundant array of inexpensive disks (RAID) configurations have been developed. RAID implementations can provide error detection and duplicate storage of information on a disk drive subsystem in the event one or more disk drives in the disk drive subsystem fail. Some of the advantages provided by RAID subsystems have been higher data transfer rates, increased disk capacity, higher input/output (I/O) rates, and faster data access. Depending upon which level of RAID was implemented, disk striping, mirroring, parity checking, or some combination was employed. For example, RAID level 4 implements block interleaved data striping with parity checking, with parity information being stored on a single disk drive. In contrast, RAID level 5 strips both data and parity information across multiple disk drives. These RAID implementations and others are well known to those of ordinary skill in the art.

In a typical peripheral component interconnect (PCI) bus based server, a custom PCI—PCI bridge has been utilized to couple a peripheral controller's local bus to a host system bus. The custom PCI—PCI bridge was implemented because a standard PCI—PCI bridge would attempt to claim all memory transactions occurring on the local bus and pass them to a host memory controller. When the peripheral controller contained peripheral memory, a peripheral memory controller might also attempt to claim the memory transaction. If this occurred, contention on the local bus would ensue such that no peripheral memory transactions could be completed. The custom PCI—PCI bridge prevented contention on the local bus by not recognizing memory transactions that were directed to the peripheral memory. This avoided contention on the local bus because the custom PCI—PCI bridge would not attempt to claim the memory transaction directed to the peripheral memory.

SUMMARY OF THE INVENTION

An embodiment of the present invention discloses a technique for concealing a peripheral memory transaction on a local bus within a peripheral controller from a host system bus. In the disclosed embodiment both the local bus and the system bus are PCI buses. The technique is implemented when a peripheral memory transaction is detected on the local bus. In the disclosed embodiment, the peripheral memory transaction is detected by monitoring command and byte enables (CBEs) and five upper address bits of the local bus (AD[31::27]).

The peripheral memory transaction is indicated when a memory transaction on the local bus is directed to an upper 128 MB of 4 GB host memory. When a memory transaction is detected to the upper 128 MB of host memory the transaction is intercepted. The interception is accomplished by blocking the CBEs on the local bus from reaching a peripheral interface. The peripheral interface, in the preferred embodiment, is a standard PCI—PCI bridge which couples the local bus to the host system bus. After being intercepted, the CBEs are recoded so that the memory transaction does not appear on the host system bus. In the disclosed embodiment the memory CBEs are recoded to reserved CBEs of the same parity.

An advantage of the present invention is that a standard PCI—PCI bridge can be utilized to interface the peripheral controller to the host system bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

The following disclosures are hereby incorporated by reference:

U.S. application Ser. No. 09/097,409, entitled "PROVIDING TWO DIFFERENT MESSAGING UNITS ON A SINGLE PERIPHERAL CONTROLLER", by Thomas W. Grieff, Bryan A. Jones, and Michael L. Sabotta, filed concurrently herewith; and U.S. application Ser. No. 09/097,493, entitled "A TECHNIQUE FOR HOT PLUGGING A PERIPHERAL CON- TROLLER CARD CONTAINING PCI AND SCSI BUSES ON A SINGLE CONNECTOR INTO A HOST SYSTEM BOARD", by Bryan A. Jones, Michael L. Sabotta, and Thomas W. Grieff, filed concurrently herewith.

COMPUTER SYSTEM OVERVIEW

Figure 1:
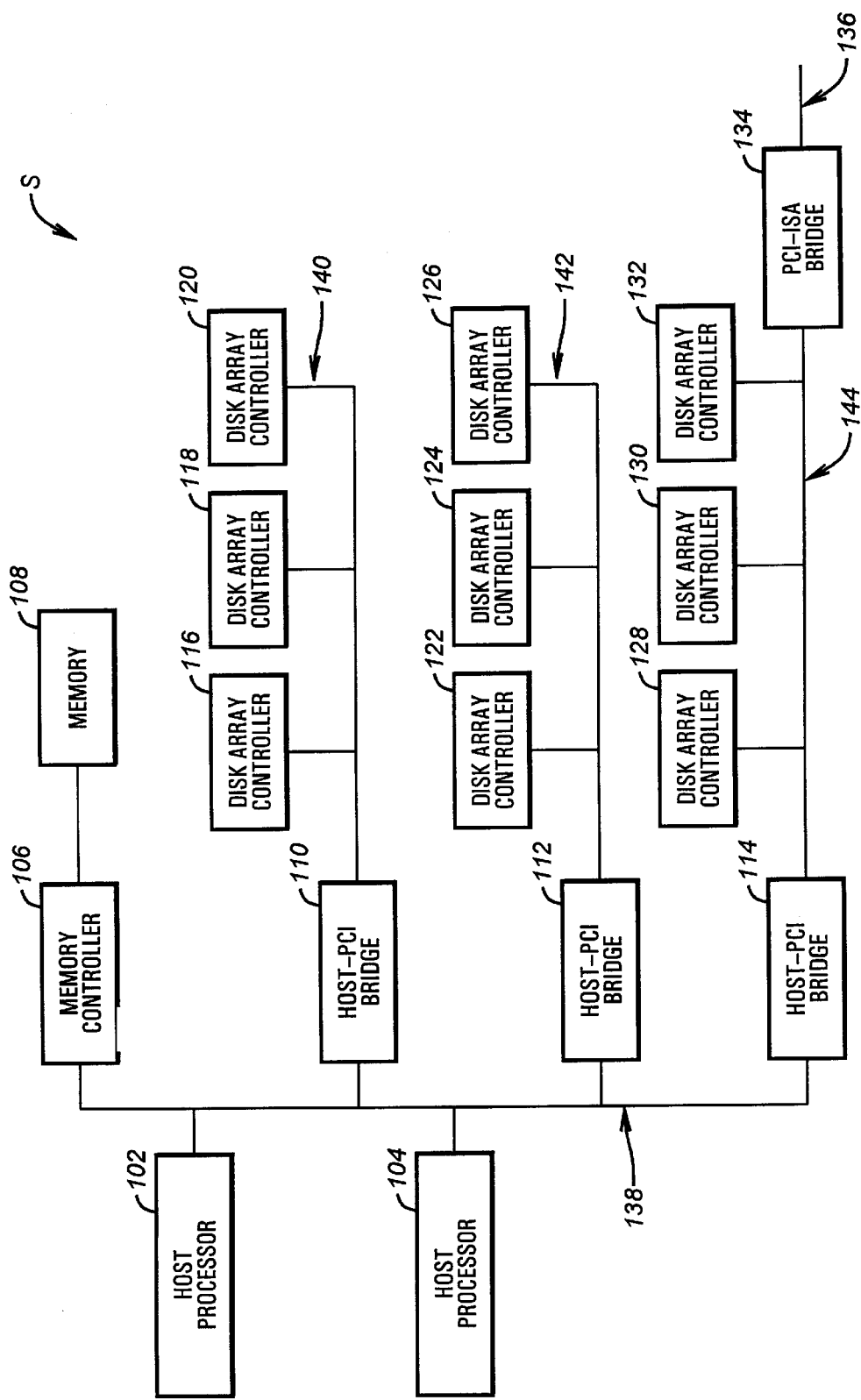
FIG. 1 is a block diagram of a computer system S implemented according to an embodiment of the present invention.

Turning to FIG. 1, illustrated is a typical computer system S implemented according to the invention. While the system S is illustrative of one embodiment, the techniques according to the invention can be implemented in a wide variety of systems. In the preferred embodiment the computer system S is a server for controlling a mass storage peripheral. The computer system S in the illustrated embodiment is a peripheral component interconnect (PCI) bus/industry standard architecture (ISA) bus based machine, having multiple PCI buses 140, 142, and 144 and an ISA bus 136. The multiple PCI buses 140–144 are controlled by PCI controller circuitry located within a corresponding host-PCI bridge 110, 112, or 114. The host-PCI bridges 110–114 couple the corresponding PCI buses 140–144 to host processors 102 and 104 via a host bus 138 and to a memory controller 106. The memory controller 106 controls host memory 108. A PCI-ISA bridge 134 connects the PCI bus 144 and the ISA bus 136.

The host bridges 110–114 can be 440LX integrated circuits manufactured by Intel Corporation. The ISA bridge 134 can be a PIIX4, also manufactured by the Intel Corporation. The host bridges 110–114 and the ISA bridge 134 provide capabilities other than bridging between the processors 102 and 104 and the PCI buses 140–144, and the PCI bus 144 and the ISA bus 136. Specifically, the disclosed host bridges 110–114 include interface circuitry that couples the host bus 138 to the appropriate PCI bus 140–144.

The host bridges 110–114 are preferably coupled to the host processors 102 and 104, which can be Pentium Pro processors. The Pentium Pro processors 102 and 104 could be replaced with different processors other than the Pentium Pro without detracting from the spirit of the invention. The processors 102 and 104 are capable of running any of a number of operating systems, such as Windows 95®, Windows NT®, or a Unix based operating system. In the disclosed embodiment of the present invention, the processors 102 and 104 run Windows NT 5.0®.

The host bridges 110–114, when the Intel 440LX is employed as the host bridge, supports extended data out (EDO) dynamic random access memory (DRAM) and synchronous DRAM (SDRAM), a sixty four/seventy two bit data path memory, a memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridges 110–114 can support up to sixty (sixty megahertz) DRAMs.

The ISA bridge 134, when the Intel PIIX4 is employed as the ISA bridge, also includes enhanced power management. It supports the PCI bus 144 at thirty or thirty-three megahertz and the ISA bus 136 at one-fourth of the PCI bus frequency. PCI revision 2.1 is supported with both positive and subtractive decoding. The standard personal computer input/output (I/O) functions are supported, including a direct memory access (DMA) controller, two 82C59 interrupt controllers, an 8254 timer, a real time clock (RTC) with a two hundred fifty six byte complementary metal oxide semiconductor (CMOS) static random access memory (SRAM), and chip selects for system read only memory (ROM), keyboard controller, an external microcontroller, and two general purpose devices. The enhanced power management within the ISA bridge 134 includes full clock control, device management, suspend and resume logic, advanced configuration and power interface (ACPI), and system management bus (SMBus) control, which implement the inter-integrated circuit ($I^2C$) protocol.

Each of the PCI buses 140–144 can couple a variety of devices that generally take advantage of a high speed data path. In the disclosed embodiment a maximum of three disk array controller cards can be coupled to each of the PCI buses 140–144. In the preferred embodiment, each disk array controller card 116, 118, 120, 122, 124, 126, 128, 130, and 132 is programmed as a RAID controller.

Again, it should be understood that a wide variety of systems could be used instead of the disclosed system S without detracting from the spirit of the invention. Further, other current and future operating systems could be utilized as well. In addition, the disk array controller cards 116–132 could potentially control various mass storage peripherals which include: tape drives, WORM, CD-ROM, and optical storage devices.

Figure 2:
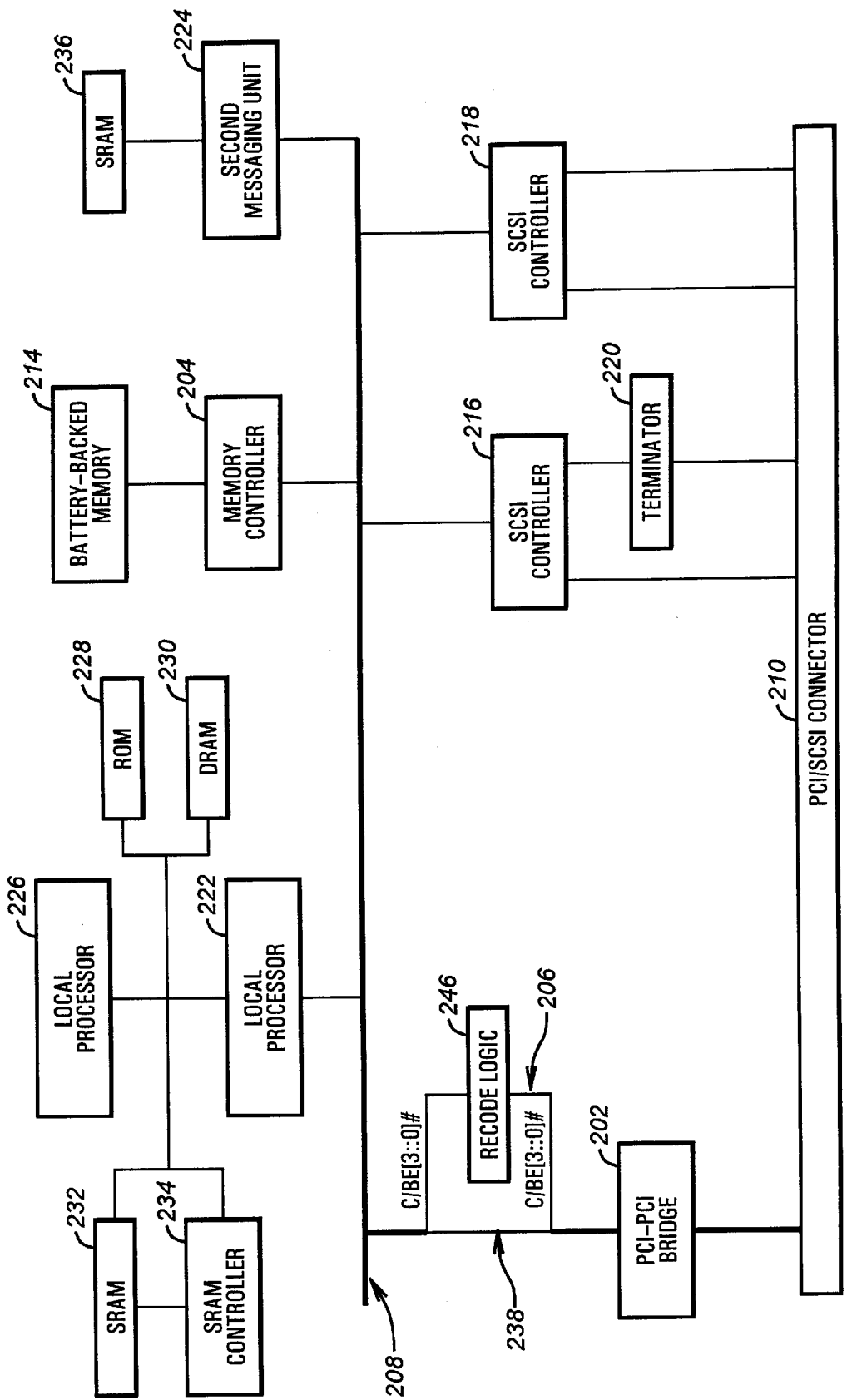
FIG. 2 is a block diagram of a disk array controller card according to an embodiment of the present invention.

Turning now to FIG. 2 the disk array controller cards 116–132 of the present invention are illustrated. It should be understood that the disk array controller circuitry could reside on a host system board or elsewhere, instead of residing on a peripheral card, without detracting from the spirit of the invention. The disk array controller cards 116–132 include a connector 210 which is used to couple the disk array controller cards 116–132 to the host system buses 140–144 and to a small computer system interface (SCSI) disk array (not shown). A bridge 202 is coupled to the host system buses 140–144 by way of the connector 210.

In a disclosed embodiment, the bridge 202 is a PCI—PCI bridge which is a standardized PCI Rev. 2.1 compliant bridge. In this embodiment the PCI—PCI bridge 202 is an IBM 82353 manufactured by International Business Machines. The PCI—PCI bridge 202 interfaces the host system bus 140–144 to a local bus 208 of the appropriate disk array controller card 116–132. In the preferred embodiment the local bus 208 is a PCI bus. CBEs 206 from the PCI—PCI bridge 202 are routed to recode logic 246. The recode logic 246 is contained within a complex programmable logic device (CPLD). An application specific integrated circuit (ASIC) provides for controlling battery-backed memory 214 through a memory controller 204.

In a typical application, a standard PCI—PCI bridge acts as a positive decode agent on a primary PCI bus and an inverse decode agent on a secondary PCI bus. The standard PCI—PCI bridge is normally programmed such that it positively decodes for certain addresses or range of addresses. When the standard PCI—PCI bridge detects one of the addresses for which it is programmed it claims the bus transaction and passes the transaction to an appropriate PCI device. The standard PCI—PCI bridge is designed to claim all memory transactions and forward them to a host memory controller.

When a memory transaction occurs on a local PCI bus within a peripheral controller, a standard PCI—PCI bridge that couples the peripheral controller to a host system PCI bus will attempt to claim the memory transaction and pass it to a host memory controller. If that peripheral controller contains memory, a peripheral memory controller may also attempt to claim the memory transaction. If this occurs, contention on the local bus will ensue such that no peripheral memory transactions can be completed. One way of avoiding contention on the local PCI bus is to design a custom PCI—PCI bridge such that the custom PCI—PCI bridge does not recognize memory transactions that are directed to peripheral memory. This avoids contention because the custom PCI—PCI bridge does not attempt to claim the memory transaction on the local PCI bus. Another technique that utilizes a standard PCI—PCI bridge implemented in an embodiment of the present invention, is to disguise the peripheral memory transaction so that the standard PCI—PCI bridge does not detect it and attempt to claim the transaction. This can be accomplished by intercepting PCI CBEs which indicate a peripheral memory transaction and recoding those CBEs.

Circuitry within the recode logic 246 detects when a memory transaction (read or write) on the local bus 208 is directed to memory allocated to an upper 128 MB of 4 GB host memory 108. This is accomplished by monitoring the upper five address bits. When a memory transaction is directed to the upper 128 MB of host memory 108, the circuitry within the recode logic 246 blocks the memory transaction from reaching the PCI—PCI bridge 202.

Figure 3:
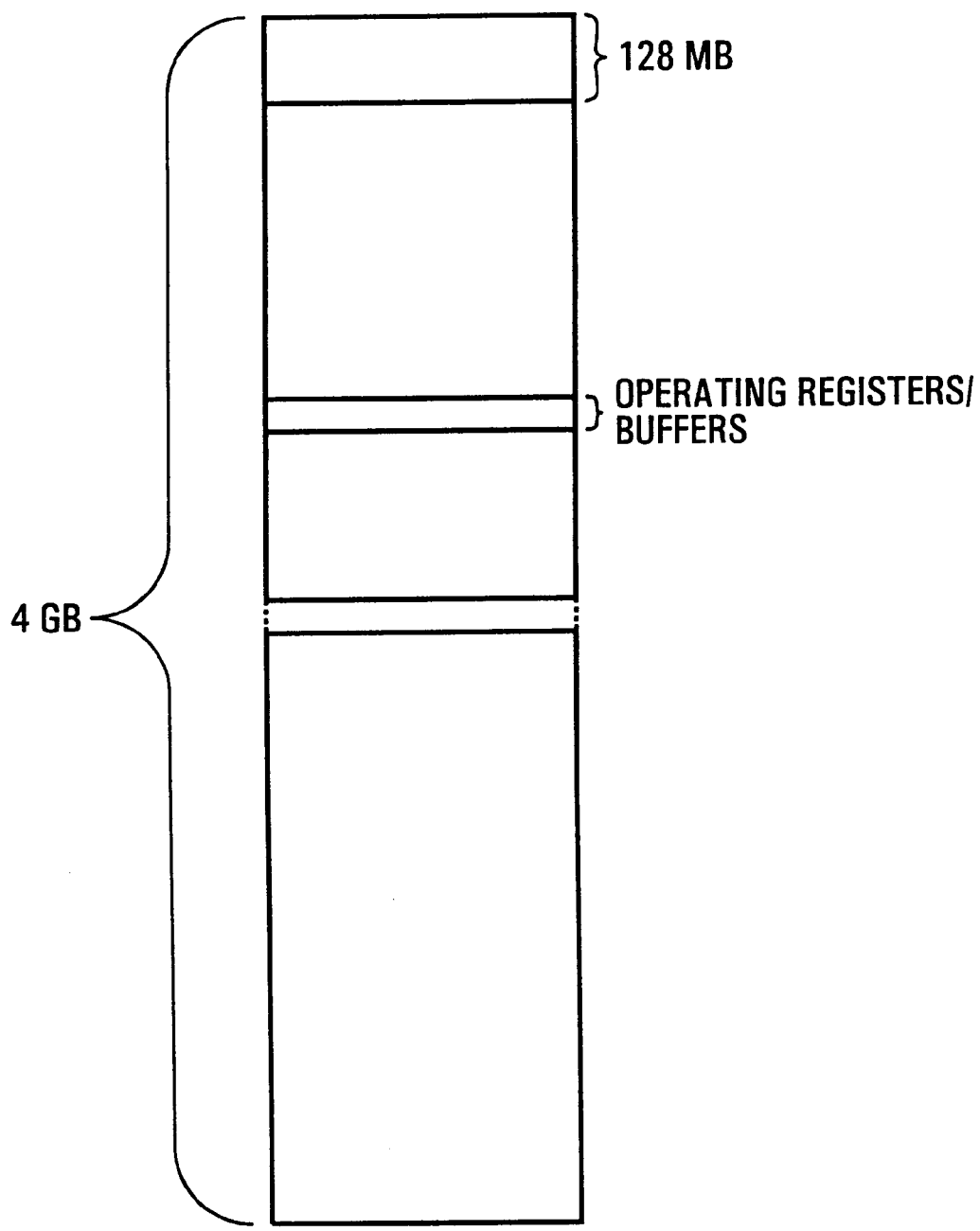
FIG. 3 is a block diagram of host memory illustrating the allocation of disk array controller card operating registers and buffers.

As a result of this memory hiding scheme none of the buffers or registers (not shown) located on the disk array controller cards 116–132 can be allocated to the upper 128 MB of the host memory 108. The mapping of the host memory 108 is further illustrated in FIG. 3. Using a 32 bit addressing scheme, 4 GB of host memory 108 can be directly addressed. As previously stated, operating buffers and registers of the disk array controller cards 116–132 must be mapped to other than the upper 128 MB of host memory 108.

Returning to FIG. 2, the recode logic 246 then recodes the memory transaction into a reserved type of CBE of the same parity as the memory CBE. The reserved type of CBE is then passed to the PCI—PCI bridge 202. The reserved type of CBE must be of the same parity as the memory CBE or the PCI—PCI bridge 202 will indicate a bad cycle. This reserved type of CBE is ignored by the PCI—PCI bridge 202, such that the memory transaction is not visible to the host system buses 140–144. Thus, when a read or write is directed to the battery-backed memory 214 the recode logic 246 hides the transaction from the host system bus 140–144.

An example of programmable logic device (PLD) code that implements the disclosed memory hiding technique is set forth below:

```
%
*   File    : PMEM.TDF - Altera Hardware Description Language
    (AHDL)
*     Subfiles : None (i.e. simulation in Verilog!)
*
*   NOTES:
*
*   1) An underscore '_' before a variable name indicates that
*      it is an active low signal.
*
*
* FUNCTION 1 - Mask uppermost 128M PCI memory
*
*       Convert PCI CBE's to "other" when the address is in the range
* of 4G - 128M to hide the battery-backed memory from the host. This
* allows the host to support 4G of memory that is not controller
* related. Accesses to battery-backed memory from the secondary side
* will be converted to reserved types: Care is taken to keep the
* parity correct on the converted cbe's.
*
%
```

-continued

```
TITLE "PMEM for Dazzler3";
SUBDESIGN 'PMEM'
(
    % globals%
    _oe         : INPUT;  % global output enable    %
    _rst        : INPUT;  % global reset input      %
    iclk        : INPUT;  % global master clock     %
    % (from) PCI inputs %
    muxout      :OUTPUT;  % convert cbe's to other  %
    _cbei[3..0] : INPUT;  % PCI Command/byte        %
                            enables in
    _cbeo[3..0] :OUTPUT;  % PCI Command/Byte        %
                            Outputs
    _frame      : INPUT;  % frame                   %
    _irdy       : INPUT;  % irdy                    %
    _trdy       : INPUT;  % trdy                    %
    _stop       : INPUT;  % stop                    %
    ad31        : INPUT;  % pci address/data        %
    ad30        : INPUT;  % pci address/data        %
    ad29        : INPUT;  % pci address/data        %
    ad28        : INPUT;  % pci address/data        %
    ad27        : INPUT;  % pci address/data        %
)
VARIABLE
    inclk       : NODE;  % global clock            %
    oe          : NODE;  % global output enable    %
    _rstin      : NODE;  % global rest             %
    cvt_en_dec  : NODE;  % convert enable decode   %
    _cbe_out[3..0] : NODE;  % twisted cbe outputs  %
    lcbe0       : DFFE;  % latched for variable latency %
    cvt_en      : DFF ;  % convert enable          %
    % buffers %
    muxout      : TRI ;  % buffers                 %
    _cbeo[3..0] : TRI ;  % buffers                 %
BEGIN
% Global declaration %
    _rstin = GLOBAL (_rst);    % global output enable buffer %
    oe = GLOBAL (!_oe);        % global output enable buffer %
    inclk = GLOBAL (iclk);     % global clock buffer         %
    lcbe0.d = _cbei[0];
    lcbe0.ena = !_frame & idle;
    lcbe0.clrn = _rstin;
    lcbe0.clk = inclk;
    cvt_en_dec = (ad31 & ad30 & ad29 & ad28 & ad27 &
    !_gnts_in) %
from 876s
        # (ad31 & ad30 & ad29 & ad28 & ad27 & !_pdpi_gnt_in);
% low is bridge to bus, high is bridge to this PLD %
IF !cvt_en_dec THEN
    _cbe_out[3..0]= _cbei[];
ELSE
    _cbe_out[3] = B"0";
    _cbe_out[2] = B"1";
    _cbe_out[1] = B"0";
    _cbe_out[0] = !(_cbei[3] $ _cbei[2] $ _cbei[1] $ _cbei[0]);
END IF;
%***************%
%   output buffers   %
%***************%
    muxout.in = cvt_en;
    muxout.oe = oe;
    _cbeo[].in = _cbe_out[];
    _cbeo[].oe = oe;
END;
```

The recode logic 246 functions to prevent contention on the local bus 208. For example, on a disk read the memory controller 204 will attempt to claim the bus transaction so that information read from the disk array (not shown) can be stored in the battery-backed memory 214. If the recode logic 246 did not exist the PCI—PCI bridge 202 would also attempt to claim the bus transaction—so that the information read from disk could be stored within the host memory 108 (see FIG. 1).

In sum, the recode logic 246 masks reads/writes to the battery-backed memory 214 by: hiding the second base address register of a first messaging unit (FMU) 222 in configuration space to prevent the FMU 222 from requesting memory space on behalf of the memory controller 204; preventing the PCI—PCI bridge 202 from seeing PCI memory transactions from SCSI controllers 216 and 218 or between the FMU 222 and the memory controller 204; and disabling configuration space access by a second messaging unit (SMU) 224 when an I20 compatible driver is not utilized.

The remainder of the PCI signal lines 238 from the PCI—PCI bridge 202 are directly coupled to the local bus 208. Also coupled to the local bus 208 are the SCSI controllers 216 and 218. Each of the SCSI controllers 216 and 218 present one load to the local bus 208. In the preferred embodiment the SCSI controllers 216 and 218 are PCI dual channel SCSI multi-function controllers (part number SYM53C876) manufactured by Symbios Logic. A first channel of the SCSI controller 216 is coupled to the connector 210. A second channel of the SCSI controller 216 allows redundant disk array controller cards to communicate, which allows the disk array controller cards 116–132 to maintain write cache coherency. The second channel of the SCSI controller 216 is coupled to a terminator 220.

The output of the terminator 220 is coupled to the connector 210. Both first and second channels of the SCSI controller 218 are coupled to the connector 210. In addition to coupling the local bus 208 of one of the disk array controller cards 116–132 to the host system bus 140–144 by way of the PCI—PCI bridge 202, the connector 210 serves to couple the first channel of the SCSI controller 216 and the first and second channels of SCSI controller 218 to the SCSI disk arrays (not shown).

The FMU 222 is used as a control agent for the SMU 224 and also provides the glue logic to interface a local processor 226 to the local bus 208. In the preferred embodiment the local processor 226 is an Am29040 manufactured by Advanced Micro Devices. The Am29040 is a high performance reduced instruction set computer (RISC) microprocessor that utilizes 32-bit architecture and is implemented using CMOS technology.

When an I20 OS driver is being used, the I20 compatible messaging unit SMU 224 responds to an I20 message by sending an interrupt to the local processor 226 through the FMU 222. The SMU 224 is also coupled to SRAM 236. The SRAM 236 provides local memory for the SMU 224. The local processor 226 is coupled to the FMU 222 and services interrupts from the SMU 224 through the FMU 222. Also coupled to the local processor 226 is DRAM 230, ROM 228, SRAM 232, and a SRAM controller 234.

The primary function of the SRAM controller 234 is to control the SRAM 232. The SRAM controller 234 is coupled to request and ready lines (not shown) of the local processor 226 and resides between the FMU 222 and the local processor 226 on those lines. In the preferred embodiment the SRAM controller is implemented in a CPLD. Executable boot code for the local processor 226 is stored in the ROM 228. A portion of the ROM 228 can be accessed through the local bus 208. The ROM 228 may include up to 256 KB of FLASH ROM. The local processor 226 utilizes the DRAM 230 and the SRAM 232 for storage of various routines.

Figure 4:
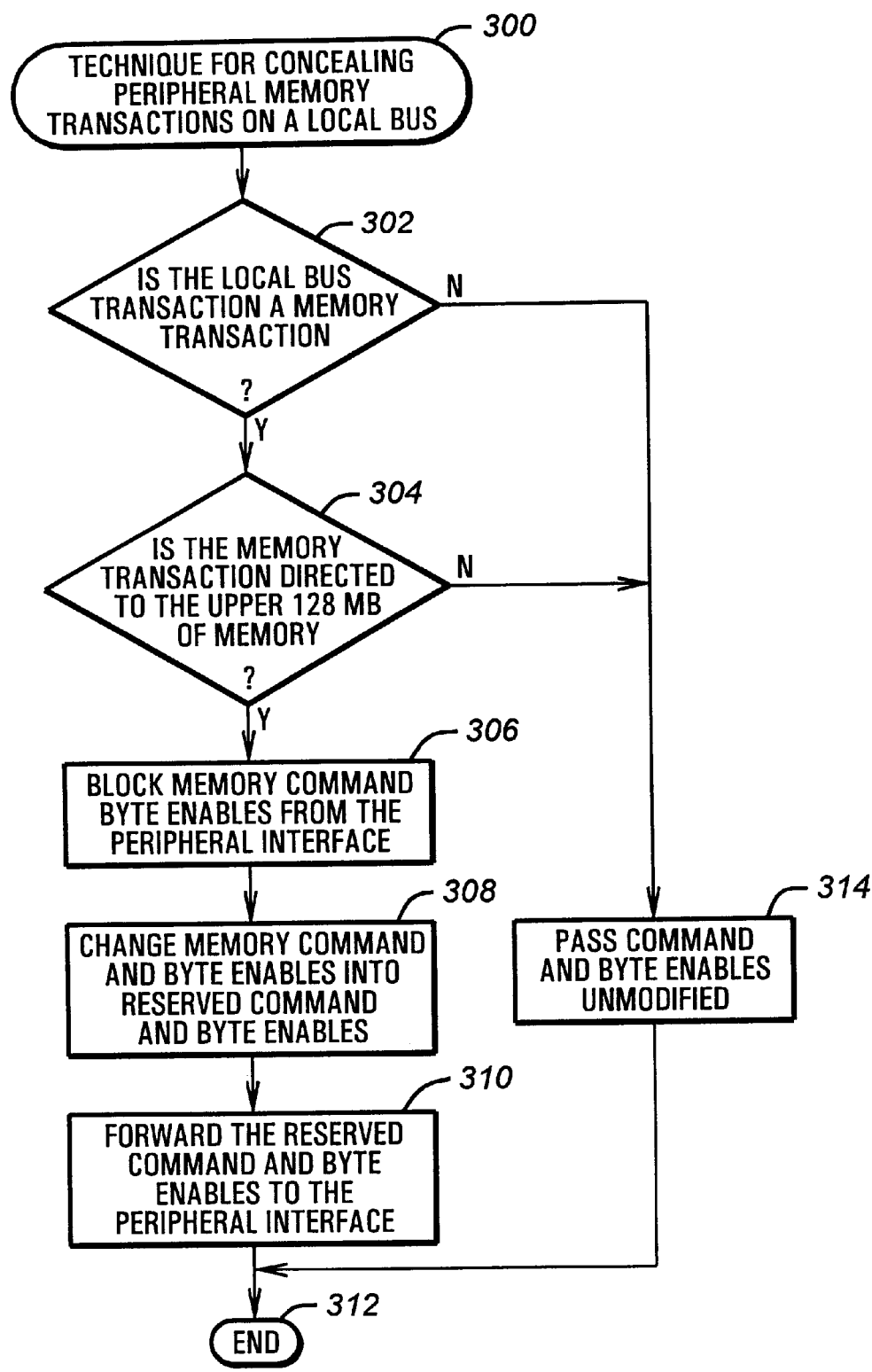
FIG. 4 is a flow chart illustrating a technique for concealing peripheral memory transactions from a host system bus.

Turning to FIG. 4, a conceal peripheral memory transaction routine 300 is further illustrated. As previously stated, in the preferred embodiment the local bus 208 and the host system buses 140–144 are PCI buses. In step 302, if a memory transaction is detected step 304 is initiated. If a memory transaction is not detected in step 302, then step 314 is initiated. In step 314 the CBEs are passed unmodified to the PCI—PCI bridge 202. Control then passes to step 312. In step 304, if a memory transaction on the local bus 208 is addressed to the upper 128 MB of memory (indicated by the upper five address bits (AD[31::27]) of the local bus 208) then step 306 is initiated.

It should be apparent from this discussion that any of the disk array controllers 116–132 set-up in this manner could not be mapped to an upper 128 MB of host memory 108. This is because the PCI—PCI bridge 202 would not see the memory transaction. It should also be apparent that a memory block could be greater or less than 128 MB depending upon the application. Also, the memory block could be mapped to other than the upper 128 MB of host memory 108 if desired.

If the memory transaction is not directed to the upper 128 MB of host memory 108 then step 314 is initiated. As before, from step 314 control passes to step 312. When the memory transaction on the local bus 208 is directed to other than the upper 128 MB of host memory 108, that memory transaction is passed by the PCI—PCI bridge 202. The memory transaction could, for example, be passed to the host memory controller 106. One skilled in the art will appreciate that local memory transactions may simultaneously occur on local buses 208 within multiple of the disk array controller cards 116–132.

In step 306 the CBEs are intercepted and blocked from reaching the PCI—PCI bridge 202. This is done to prevent contention on the local bus 208. For example, during a read from an array of storage elements the memory controller 204 would attempt to claim the bus transaction so that the information read from the array of storage elements could be written to the battery-backed memory 214. The PCI—PCI bridge 202 would also attempt to claim the bus transaction so that the information read from the array of storage elements could be stored in the host memory 108. Thus, by intercepting and blocking the CBEs contention on the local bus 208 is avoided.

After the CBEs are blocked in step 306, step 308 is initiated. In step 308 the memory CBEs are converted into reserved CBEs. As previously discussed, if parity is not maintained in the conversion the PCI—PCI bridge 202 will indicate an error. To maintain parity, the memory transaction CBE is converted to a reserved type of CBE of the same parity. After the conversion in step 308, the reserved CBEs are forwarded to the PCI—PCI bridge 202 in step 310. The PCI—PCI bridge 202 determines that the CBEs are reserved CBEs and ignores them, thus the peripheral memory transaction is effectively concealed from the host system bus 140–144.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of concealing a peripheral memory transaction on a local bus within a peripheral controller from a host system bus, the peripheral controller being coupled to the host system bus through a peripheral interface, the method comprising the steps of:

detecting the peripheral memory transaction on the local bus;

intercepting the peripheral memory transaction on the local bus; and recoding the peripheral memory transaction so that the peripheral memory transaction does not appear on the host system bus.

2. The method of claim 1, wherein the peripheral memory transaction is a read or a write to local peripheral memory.

3. The method of claim 1, wherein multiple peripheral memory transactions can occur simultaneously on different peripheral controllers coupled to the host system bus.

4. The method of claim 1, wherein the peripheral controller is programmed for RAID.

5. The method of claim 4, wherein the peripheral controller is coupled to an array of storage elements.

6. The method of claim 1, wherein the local bus is a PCI bus and the peripheral memory transaction detecting step further includes:

monitoring command and byte enables of the local bus; and monitoring an upper five address bits of the local bus.

7. The method of claim 1, wherein the local bus is a PCI bus and the peripheral memory transaction intercepting step further includes:

blocking memory command and byte enables of the local bus from the peripheral interface.

8. The method of claim 7, wherein the memory command and byte enables are blocked only when an upper 128 MB of memory is addressed.

9. The method of claim 1, wherein the local bus is a PCI bus and the peripheral memory transaction recoding step further includes:

changing memory command and byte enables of the local bus into reserved command and byte enables of the same parity.

10. The method of claim 1, wherein the peripheral interface is a PCI—PCI bridge.

11. A peripheral controller with the capability of concealing a peripheral memory transaction on a local bus within the peripheral controller from a host system bus, the peripheral controller being coupled to the host system bus through a peripheral interface, the controller comprising:

detection logic for detecting the peripheral memory transaction on the local bus;

interception logic for intercepting the peripheral memory transaction on the local bus; and recode logic for recoding the peripheral memory transaction so that the peripheral memory transaction does not appear on the host system bus.

12. The peripheral controller of claim 11, wherein the peripheral memory transaction is a read or a write to local peripheral memory.

13. The peripheral controller of claim 11, wherein multiple peripheral memory transactions can occur simultaneously on different peripheral controllers coupled to the host system bus.

14. The peripheral controller of claim 11, wherein the peripheral controller is programmed for RAID.

15. The peripheral controller of claim 14, wherein the peripheral controller is coupled to an array of storage elements.

16. The peripheral controller of claim 11, wherein the local bus is a PCI bus and the detection logic further includes:

command and enable monitor logic for monitoring command and byte enables of the local bus; and address logic for monitoring an upper five address bits of the local bus.

17. The peripheral controller of claim 11, wherein the local bus is a PCI bus and the interception logic further includes:

block logic for blocking memory command and byte enables of the local bus from the peripheral interface.

18. The peripheral controller of claim 17, wherein the memory command and byte enables are blocked only when an upper 128 MB of host memory is addressed.

19. The peripheral controller of claim 11, wherein the local bus is a PCI bus and the peripheral memory transaction recoding step further includes:

change logic for changing memory command and byte enables of the local bus into reserved command and byte enables of the same parity.

20. The peripheral controller of claim 11, wherein the peripheral interface is a PCI—PCI bridge.

21. A computer system comprising:

a host system bus;

a processor coupled to the system bus; and a peripheral controller with the capability of concealing a peripheral memory transaction on a local bus within the peripheral controller from the host system bus, the peripheral controller being coupled to the system bus through a peripheral interface, the controller comprising:

detection logic for detecting the peripheral memory transaction on the local bus;

interception logic for intercepting the peripheral memory transaction on the local bus; and recode logic for recoding the peripheral memory transaction so that the peripheral memory transaction does not appear on the host system bus.

22. The computer system of claim 21, wherein the peripheral memory transaction is a read or a write to local peripheral memory.

23. The computer system of claim 21, wherein the peripheral controller is programmed for RAID.

24. The computer system of claim 23, wherein the peripheral controller is coupled to an array of storage elements.

25. The computer system of claim 21, wherein multiple peripheral memory transactions occur simultaneously on different peripheral controllers coupled to the host system bus.

26. The computer system of claim 21, wherein the local bus is a PCI bus and the detection logic of the peripheral controller further includes:

command and enable monitor logic for monitoring command and byte enables of the local bus; and address logic for monitoring an upper five address bits of the local bus.

27. The computer system of claim 21, wherein the local bus is a PCI bus and the interception logic of the peripheral controller further includes:

block logic for blocking memory command and byte enables of the local bus from the peripheral interface.

28. The computer system of claim 27, wherein the memory command and byte enables are blocked only when an upper 128 MB of memory is addressed.

29. The computer system of claim 21, wherein the local bus is a PCI bus and the peripheral memory transaction recoding logic of the peripheral controller further includes:

change logic for changing memory command and byte enables of the local bus into reserved command and byte enables of the same parity.

30. The computer system of claim 21, wherein the peripheral interface is a PCI—PCI bridge.

* * * * *